(12) United States Patent
Hamami et al.

(10) Patent No.: US 12,183,117 B2
(45) Date of Patent: Dec. 31, 2024

(54) USER AUTHENTICATION USING POSE-BASED FACIAL RECOGNITION

(71) Applicant: Google LLC, Mountain View, CA (US)

(72) Inventors: Cem Kemal Hamami, Seattle, WA (US); Joseph Edwin Johnson, Jr., Seattle, WA (US); Kuntal Sengupta, Mountain View, CA (US); Piotr Kulaga, Seattle, WA (US); Wen-Sheng Chu, Santa Clara, CA (US); Zachary Iqbal, Mountain View, CA (US)

(73) Assignee: Google LLC, Mountain View, CA (US)

( * ) Notice: Subject to any disclaimer, the term of this patent is extended or adjusted under 35 U.S.C. 154(b) by 487 days.

(21) Appl. No.: 17/433,912

(22) PCT Filed: Apr. 3, 2019

(86) PCT No.: PCT/US2019/025493
§ 371 (c)(1),
(2) Date: Aug. 25, 2021

(87) PCT Pub. No.: WO2020/176115
PCT Pub. Date: Sep. 3, 2020

(65) Prior Publication Data
US 2022/0139109 A1 May 5, 2022

Related U.S. Application Data

(60) Provisional application No. 62/811,978, filed on Feb. 28, 2019.

(51) Int. Cl.
*G06T 7/70* (2017.01)
*G06F 21/32* (2013.01)
(Continued)

(52) U.S. Cl.
CPC ............ *G06V 40/172* (2022.01); *G06F 21/32* (2013.01); *G06F 21/44* (2013.01); *G06T 7/70* (2017.01);
(Continued)

(58) Field of Classification Search
CPC .. G06V 40/172; G06V 10/772; G06V 40/173; G06V 40/50; G06T 7/70;
(Continued)

(56) References Cited

U.S. PATENT DOCUMENTS 8,150,109 B2 4/2012 Sung et al.
9,020,209 B2 4/2015 Minato
(Continued)

FOREIGN PATENT DOCUMENTS

CN 103434484 A 12/2013
CN 105096528 A 11/2015
(Continued)

OTHER PUBLICATIONS

"Asthana et al., Fully Automatic Pose-Invariant Face Recognition via 3D Pose Normalization, 2011, IEEE, 2011 Computer Vision Conference, pp. 937-944" (Year: 2011).*
(Continued)

*Primary Examiner* — Chan S Park
*Assistant Examiner* — D J Dhooge
(74) *Attorney, Agent, or Firm* — Shumaker & Sieffert, P.A.

(57) ABSTRACT

A method includes receiving data indicative of an image of a face of an unknown user of the computing device while the computing device is in a reduced access mode locked state. The method also includes determining whether the unknown user is the known user by at least comparing the image of the face of the unknown user to one or more images of a plurality of images of a face of a known user of the
(Continued)

computing device. The method further includes setting the computing device to an increased access mode in response to determining that the unknown user is the known user.

17 Claims, 3 Drawing Sheets

(51) Int. Cl.
   *G06F 21/44* (2013.01)
   *G06V 10/772* (2022.01)
   *G06V 40/16* (2022.01)
   *G06V 40/50* (2022.01)

(52) U.S. Cl.
   CPC .......... *G06V 10/772* (2022.01); *G06V 40/173* (2022.01); *G06V 40/50* (2022.01); *G06F 2221/2141* (2013.01); *G06T 2207/30201* (2013.01)

(58) Field of Classification Search
   CPC ........... G06T 2207/30201; G06F 21/32; G06F 21/44; G06F 2221/2141
   See application file for complete search history.

(56) References Cited

U.S. PATENT DOCUMENTS

| | | | |
|---|---|---|---|
| 9,174,552 | B2 | 11/2015 | Ikeda et al. |
| 9,298,976 | B2 | 3/2016 | Je et al. |
| 10,210,381 | B1 | 2/2019 | Mostafa et al. |
| 2010/0039224 | A1 | 2/2010 | Okude et al. |
| 2014/0301650 | A1 | 10/2014 | Irie |
| 2016/0148381 | A1 | 5/2016 | Aoki et al. |
| 2017/0041816 | A1 | 2/2017 | Cho et al. |
| 2017/0124385 | A1 | 5/2017 | Ganong et al. |
| 2018/0218139 | A1 | 8/2018 | Tussy |
| 2019/0026449 | A1* | 1/2019 | Richman .............. G06V 10/235 |
| 2019/0039570 | A1 | 2/2019 | Foster et al. |
| 2019/0071055 | A1 | 3/2019 | Luchner et al. |
| 2020/0104033 | A1* | 4/2020 | Ho ....................... G06V 40/172 |
| 2021/0229673 | A1 | 7/2021 | Singh et al. |

FOREIGN PATENT DOCUMENTS

| | | |
|---|---|---|
| CN | 105644500 A | 6/2016 |
| CN | 107800708 A | 3/2018 |
| CN | 108790743 A | 11/2018 |
| EP | 3456592 A1 | 3/2019 |
| JP | 2002-288670 A | 10/2002 |
| JP | 2007-128262 A | 5/2007 |
| JP | 2008213634 A | 9/2008 |
| JP | 2009-284442 A | 12/2009 |
| JP | 2009-286342 A | 12/2009 |
| JP | 2014-203353 A | 10/2014 |
| JP | 2016-055789 A | 4/2016 |
| JP | 2019-032694 A | 2/2019 |
| JP | 2019-083015 A | 5/2019 |
| KR | 20050053130 A | 6/2005 |
| KR | 20140138612 A | 12/2014 |
| KR | 20160059793 A | 5/2016 |
| KR | 20170017111 A | 2/2017 |
| WO | 2013130036 A1 | 9/2013 |
| WO | 2015001791 A1 | 1/2015 |
| WO | WO-2020176115 A1 * | 9/2020 ............. G06F 21/32 |

OTHER PUBLICATIONS

Response to First Examination Report dated Feb. 2, 2023, from counterpart Indian Application No. 202147043151 filed Jul. 19, 2023, 20 pp.
Notice of Intent to Grant and Text Intended to Grant from counterpart European Application No. 19717717.3 dated Jul. 27, 2023, 45 pp.
International Search Report & Written Opinion from International Application No. PCT/US2019/025493 mailed Nov. 21, 2019, 16 pp.
Hassner et al., "Pooling Faces: Template Based Face Recognition with Pooled Face Images", 2016 IEEE Conference on Computer Vision and Pattern Recognition Workshops (CVPRW), IEEE, Jun. 26, 2016, pp. 127-135, XP033027817.
First Examination Report from counterpart Indian Application No. 202147043151 dated Feb. 2, 2023, 7 pp.
Response to Communication Pursuant to Rules 161(1) and 162 EPC dated Aug. 24, 2021, from counterpart European Application No. 19717717.3, filed Feb. 24, 2022, 16 pp.
International Preliminary Report on Patentability from International Application No. PCT/US2019/025493, issued Aug. 25, 2021, 8 pp.

* cited by examiner

USER AUTHENTICATION USING POSE-BASED FACIAL RECOGNITION

BACKGROUND

A computing device may perform facial recognition to authenticate a user of the computing device. The computing device may capture an image of an unknown user and compare the image to an image of a known, previously authenticated user to determine whether the unknown user is a known user. The user may hold the computing device below the level of his or her face, may rotate the computing device, or may tilt or turn his or her head relative to the computing device when the computing device captures the image of the unknown user. In such situations, the computing device may have difficulty determining whether the unknown user is a known user.

SUMMARY

In general, the disclosed subject matter relates to techniques for performing facial recognition to authenticate a user of a computing device. A computing device may perform an enrollment process to capture a plurality of images of a face of a known user in a variety of different poses. The computing device may assign each of the images of the known user to a respective pose bucket of a plurality of pose buckets. The computing device determines whether a number of pose buckets that include an image of the known user satisfies a threshold number of pose buckets, and if so, enrolls the images by associating the images of the known user with a user account for the known user. If the number of pose buckets that include an image of the known user does not satisfy the threshold number of pose buckets, the computing device may capture additional images in different poses until the number of pose buckets that include an image of the known user does satisfy the threshold number of pose buckets.

The computing device may authenticate the unknown user by capturing an authentication image (also referred to as a test image) of the unknown user and comparing the authentication image to one or more enrolled images of the known user. For example, the computing device may determine a pose bucket associated with the authentication image of the unknown user's face, select an image of the known user that is included in the same pose bucket as the pose bucket associated with the authentication image, and compare the selected image to the authentication image to determine whether the unknown user is the known user. As another example, the computing device may compare the authentication image to each of the enrolled images to determine which of the enrolled images of the known user are most similar to the authentication image for the unknown user. The computing device may determine whether the unknown user is the known user based on the most similar enrolled images of the known user, regardless of the pose buckets.

By enrolling images included in several different pose buckets, the computing device may more accurately perform facial recognition to authenticate an unknown user. For instance, enrolling images of a known user that are included in several pose buckets may increase the probability that the pose bucket associated with the authentication image (e.g., the pose of the unknown user's face) is similar to the pose buckets that include the enrolled images of the known user (e.g., the pose of the known user in the enrolled images). Increasing the probability that the pose of the authentication image of the unknown user is similar to the pose of one or more enrolled images of a known user may reduce the probability of falsely rejecting the unknown user when the unknown user is in fact a known, authorized user. In some instances, increasing the probability that the pose of the authentication image of the unknown user is similar to the pose of one or more enrolled images of a known user may reduce the probability of falsely accepting the unknown user when the unknown user is not a known, authorized user. In this way, the computing device may more accurately authenticate images of unknown users regardless of the pose of the unknown user.

In one example, a method includes receiving, by at least one processor of a computing device, data indicative of an image of a face of an unknown user of the computing device while the computing device is in a reduced access mode. The method also includes determining, by the at least one processor, whether the unknown user is a known user of the computing device by at least comparing the data indicative of the image of the face of the unknown user to data indicative of one or more images of a plurality of images of a face of the known user. Each of the one or more images of the face of the known user is included in at least one pose bucket from a plurality of pose buckets. Each pose bucket from the plurality of pose buckets is associated with a respective range of pitch angles of the face of the known user and a respective range of yaw angles of the face of the known user. The method further includes responsive to determining that the unknown user is the known user, setting, by the at least one processor, the computing device to an increased access mode.

In another example a computer-readable storage medium is described including instructions that, when executed, cause at least one processor of a computing device to perform operations including: receiving, by at least one processor of a computing device, data indicative of an image of a face of an unknown user of the computing device while the computing device is in a reduced access mode. The operations also include determining, by the at least one processor, whether the unknown user is a known user of the computing device by at least comparing the data indicative of the image of the face of the unknown user to data indicative of one or more images of a plurality of images of a face of the known user. Each of the one or more images of the face of the known user is included in at least one pose bucket from a plurality of pose buckets. Each pose bucket from the plurality of pose buckets is associated with a respective range of pitch angles of the face of the known user and a respective range of yaw angles of the face of the known user. The operations further include responsive to determining that the unknown user is the known user, setting, by the at least one processor, the computing device to an increased access mode.

In another example, a computing system is described that includes at least one processor configured to perform operations including: receiving, by at least one processor of a computing device, data indicative of an image of a face of an unknown user of the computing device while the computing device is in a reduced access mode. The operations also include determining, by the at least one processor, whether the unknown user is a known user of the computing device by at least comparing the data indicative of the image of the face of the unknown user to data indicative of one or more images of a plurality of images of a face of the known user. Each of the one or more images of the face of the known user is included in at least one pose bucket from a plurality of pose buckets. Each pose bucket from the plurality of pose buckets is associated with a respective range of pitch angles of the face of the known user and a respective range of yaw angles of the face of the known user. The operations further include responsive to determining that the unknown user is the known user, setting, by the at least one processor, the computing device to an increased access mode.

In another example, a system is described including means for receiving, by at least one processor of a computing device, data indicative of an image of a face of an unknown user of the computing device while the computing device is in a reduced access mode. The system also includes means for determining, by the at least one processor, whether the unknown user is a known user of the computing device by at least comparing the data indicative of the image of the face of the unknown user to the data indicative of one or more images of a plurality of images of a face of a known user of the computing device. Each of the one or more images of the face of the known user is included in at least one pose bucket from a plurality of pose buckets. Each pose bucket from the plurality of pose buckets is associated with a respective range of pitch angles of the face of the known user and a respective range of yaw angles of the face of the known user. The system further includes means for, responsive to determining that the unknown user is the known user, setting, by the at least one processor, the computing device to an increased access mode.

The details of one or more examples are set forth in the accompanying drawings and the description below. Other features, objects, and advantages of the disclosure will be apparent from the description and drawings, and from the claims.

DETAILED DESCRIPTION

Figure 1:
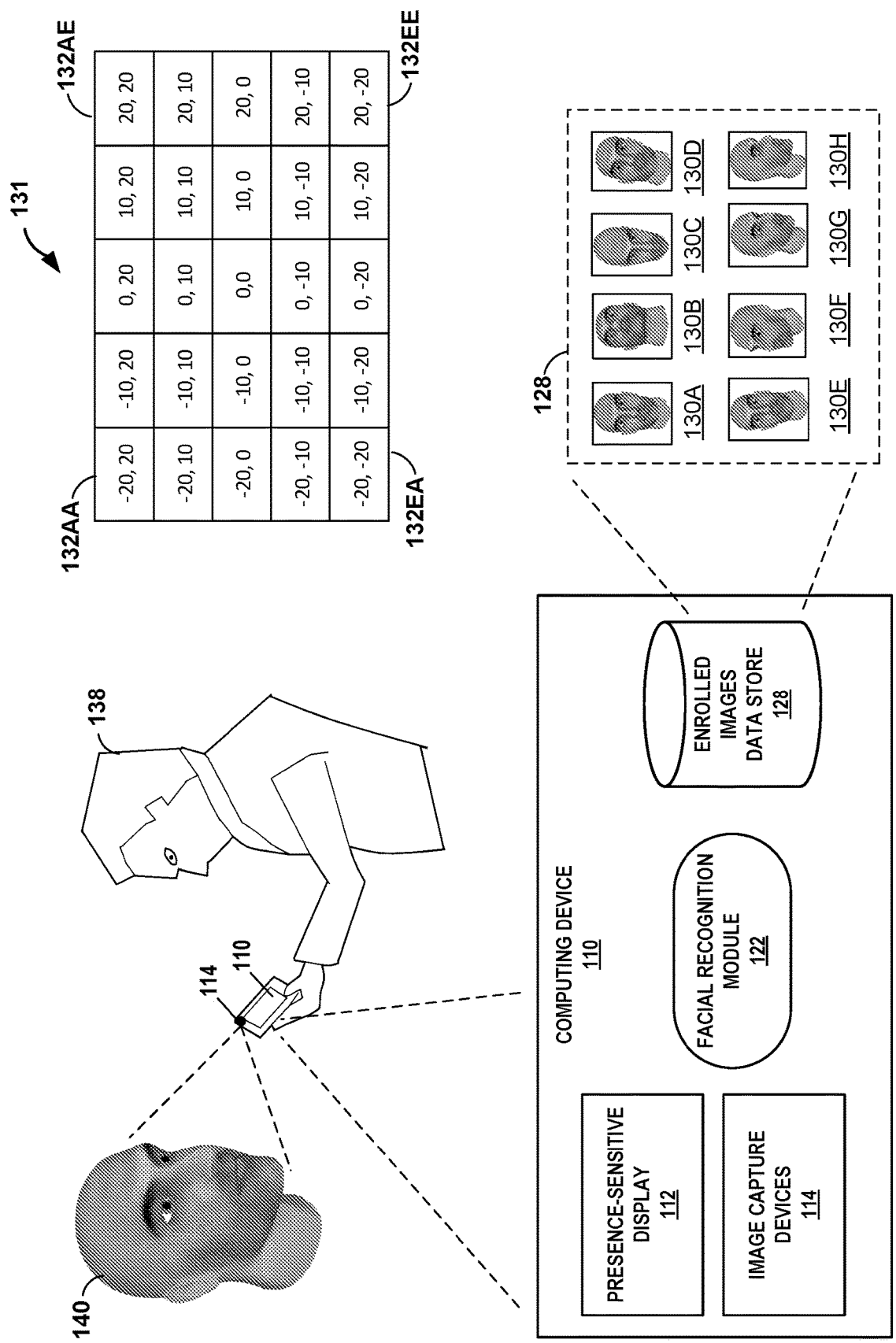
FIG. 1 is a conceptual diagram illustrating an example computing device that performs facial recognition to authenticate a user, in accordance with one or more aspects of the present disclosure.

FIG. 1 is a conceptual diagram illustrating an example computing device 110 that performs facial recognition to authenticate a user, in accordance with one or more aspects of the present disclosure. Computing device 110 may be a mobile device, such as a smart phone, a tablet computer, a laptop computer, computerized watch, computerized eyewear, computerized gloves, or any other type of portable computing device. Additional examples of computing device 110 include other mobile and non-mobile devices, such as desktop computers, televisions, personal digital assistants (PDA), portable and non-portable gaming systems, digital media players or micro-consoles, e-book readers, mobile television platforms, automobile navigation and entertainment systems, or any other types of wearable and non-wearable, mobile or non-mobile computing devices.

As shown in FIG. 1, computing device 110 includes a presence-sensitive display (PSD) 112, one or more image capture devices 114, facial recognition module (FRM) 122, and enrolled images data store 128. FRM 122 may perform operations described using software, hardware, firmware, or a mixture of hardware, software, and firmware residing in and/or executing at computing device 110. Computing device 110 may execute FRM 122 with multiple processors or multiple devices. Computing device 110 may execute FRM 122 as a virtual machine executing on underlying hardware. FRM 122 may execute as one or more services of an operating system or computing platform. FRM 122 may execute as one or more executable programs at an application layer of a computing platform.

PSD 112 of computing device 110 may function as respective input and/or output devices for computing device 110. PSD 112 may be implemented using various technologies. For instance, PSD 112 may function as input devices using presence-sensitive input screens, such as resistive touchscreens, surface acoustic wave touchscreens, capacitive touchscreens, projective capacitance touchscreens, pressure sensitive screens, acoustic pulse recognition touchscreens, or another presence-sensitive display technology. PSD 112 may detect input from a user of computing device 110. For example, PSD 112 may detect one or more gestures performed on or within a threshold distance of PSD 112 (e.g., a user touching PSD 112 with a finger or a stylus or moving the finger or stylus within a threshold distance of a surface of PSD 112).

PSD 112 may also function as output (e.g., display) devices using any one or more display devices, such as liquid crystal displays (LCD), dot matrix displays, light emitting diode (LED) displays, organic light-emitting diode (OLED) displays, e-ink, or similar monochrome or color displays capable of outputting visible information to a user of computing device 110. PSD 112 may output information (e.g., to a user) as a user interface (e.g., a graphical user interface), which may be associated with functionality provided by computing device 110. For example, PSD 112 may display various user interfaces related to an application module or other features of computing platforms, operating systems, applications, and/or services executing at or accessible from computing device 110.

Image capture devices 114 may include one or more cameras, such as digital cameras, still cameras, motion picture cameras, and the like. Image capture devices 114 may include any other devices capable of capturing and storing still or moving images. In some examples, image capture devices 114 may be capable of digitally recording images via an electronic image sensor. Image capture devices 114 may be configured to generate image data indicative of an image in response to detecting visible light (e.g., light visible by humans, with wavelengths between approximately 380 nanometers to approximately 740 nanometers) or near infrared (NIR) light (e.g., light adjacent to the visible light spectrum, such as light with wavelengths between approximately 750 nanometers and approximately 1400 nanometers). In some examples, computing device 110 includes an image capture device 114 configured to generate image data indicative of 2-dimensional images. In another example, computing device 110 includes a plurality of image capture device 114 configured to generate image data indicative of 3-dimensional images. In this way, a plurality of image capture devices 114 may generate image data indicative of 2-dimensional images, 3-dimensional images, or both.

In accordance with techniques of this disclosure, FRM 122 may perform facial recognition to authenticate a user of computing device 110. In general, FRM 122 may perform an enrollment process (e.g., one time, such as during an initial setup of computing device 110) and periodically execute an authentication process to determine whether an unknown user is, in fact, a known user. During the enrollment process, image capture devices 114 may capture one or more images 130A-130H (collectively, images 130) of a known user (e.g., a user logged in to a user account associated) and PSD 112 may output a graphical user interface (GUI) that includes the one or more images of the known user. In this way, the known user may be able to view images 130 as images 130 are captured by image captures devices 114 and may adjust his or her head and/or computing device 110 to enable image capture devices 114 to capture images of the face of the known user in a variety of different poses. Image capture devices 114 may output image data for each of images 130 to FRM 122.

FRM 122 analyzes the image data received from image capture devices 114 and assigns each of images 130 to one or more pose buckets 132AA-132EE (collectively, pose buckets 132). Each pose bucket 132 is associated with a range of pitch angles (also referred as tilt angle) and yaw angles (also referred to as a pan angle) of the user's face. As used herein, the pitch angle refers to an angle of the user's face relative to a horizontal axis and the yaw angle refers to an angle of the user's face relative to a vertical axis that is perpendicular to the horizontal axis. For example, each of pose buckets 132 may be associated with a respective yaw and pitch range. In the example of FIG. 1, the size of each of pose buckets 132 is equal (e.g., 10 degrees). For example, each of pose buckets 132 is associated with a 10-degree range of pitch angles and a 10-degree range of yaw angles. However, in some examples, the size of pose buckets 132 may be different. For example, pose bucket may associated with an 8-degree range of pitch angles (and/or range of yaw angles) and another pose bucket may be associated with a 10-degree range of pitch angles (and/or range of yaw angles).

For purposes of illustration, pose buckets 132 are shown in FIG. 1 as part of a table 131. As illustrated in the example of FIG. 1, the yaw and pitch angles shown in table 131 represent the center of each respective pose bucket 132. For example, the center of pose bucket 132AA is -20 degrees in yaw and 20 degrees in pitch. In other words, the pose bucket 132AA may represent -15 to -25 degrees in yaw, and 15 to 25 degrees in pitch. Similarly, in the example of FIG. 1, the center of pose bucket 132AN is 20 degrees in yaw and 20 degrees in pitch, such that pose bucket 132AN represents 15 degrees to 25 degrees in yaw and 15 degrees to 25 degrees in pitch. While table 131 includes 25 pose buckets 132, in some examples, table 131 may include a different number of pose buckets 132. While pose buckets 132 are illustrated as part of a table 131 to aid understanding, pose buckets 132 may not be stored in a table. Pose buckets 132 may be stored in any data structure and may be organized in any manner.

FRM 122 may determine which of pose buckets 132 is associated with an image based on characteristics or landmarks of the face of the known user included in the image. For instance, FRM 122 may detect landmarks in the images of the user's face, such as the user's eyes, nose, and mouth, and may determine the yaw and pitch angles of the user's face based on the landmarks. For example, FRM 122 may determine that image 130A should be included in pose bucket 132CC based on the yaw and pitch angles of the user's face in image 130A and the range yaw and pitch angles associated with pose bucket 132CC. For instance, FRM 122 may determine that the yaw angle of the user's face in image 130A is is 0 degrees and the pitch angle of the known user's face is 0 degrees. FRM 122 may determine that pose bucket 132CC is associated with a range of yaw angles from -5 to 5 degrees and a range of pitch angles from -5 degrees to 5 degrees (e.g., pose bucket 132CC is centered at 0 degrees yaw and 0 degrees pitch). In such examples, FRM 122 may determine that pose bucket 132CC includes image 130A in response to determining that the yaw and pitch angle of the user's face in image 130A falls within the range of yaw and pitch angles associated with pose bucket 132CC.

As another example, FRM 122 may determine the yaw angle of user's face in image 130B is 0 degrees (e.g., centered in the left and right directions) and the pitch angle of the user's face is 23 degrees (e.g., the known user is looking up). FRM 122 may determine that pose bucket 132AC is associated with a range of yaw angles from -5 to 5 degrees and a range of pitch angles from 15 degrees to 25 degrees (e.g., pose bucket 132CC is centered at 0 degrees yaw and 20 degrees pitch). In such examples, FRM 122 may determine that pose bucket 132AC includes image 130B in response to determining that the yaw and pitch angle of the user's face in image 130B falls within the range of yaw and pitch angles associated with pose bucket 132AC.

FRM 122 may receive data indicative images 130 from image capture devices 114 and determine whether a threshold number of pose buckets 132 include one of images 130. For example, FRM 122 may determine a number of pose buckets 132 that include images 130 of the face of the known user. In the example of FIG. 1, FRM 122 determines that images 130 are included within 19 pose buckets (e.g., 132AB, 132AC, 132BA, 132BB, 132BC, 132BD, 132BE, 132CA, 132CB, 132CC, 132CD, 132CE, 132DB, 132DC, 132DD, 132DE, 132EB, 132EC, and 132 ED) of 25 possible pose buckets 132. In some examples, FRM 122 determines whether the number of pose buckets that include images 130 satisfies (e.g., is greater than or equal to) a threshold number (e.g., 15 pose buckets, 17 pose buckets, 19 pose buckets, etc.; or 65% of pose buckets 132, 75% of pose buckets 132, 85% of pose buckets 132, etc.). For example, FRM 122 may determine that the number of pose buckets 132 that include images 130 satisfies the threshold number of pose buckets in response to determining that images 130 are included within at least 75% of pose buckets 132. Determining the number of pose buckets 132 that include images 130 satisfies the threshold number of pose buckets may indicate that images 130 show the face of the known user in enough different poses to more accurately authenticate a user.

Responsive to determining that the number of pose buckets that include images 130 does not satisfy the threshold number of pose buckets, image capture device 114 may capture one or more additional images 130 for the enrollment process. For example, FRM 122 may output a graphical user interface instructing the known user to move his or her head to capture images of different angles of the face of the known user.

Responsive to determining that the number of pose buckets that include images 130 satisfies the threshold number of pose buckets, FRM 122 may associate data indicative of the images 130 with a user account for the known user. In some examples, the data indicative of images 130 may include the images themselves or image templates (also referred to as embeddings) for each respective image. As one example, an image template may generally correspond to a statistical model of one or more features of a user's face. For example, FRM 122 may generate an image template that includes a vector with a plurality of element values (e.g., 50 values, 100 values, 500 values, etc.). In some examples, each element value of the vector corresponds to a feature of the user's face (e.g., distance between the eyes, nose shape, etc.). Alternatively or additionally, element values of the vector may be generated through a non-linear machine learned model trained to generate outputs indicative of a facial identity. For example, FRM 122 may apply a trained facial recognition model to the plurality of images 130 and output an image template (e.g., embedding) for each respective image 130 as a vector. In some examples, FRM 122 associates the data indicative of images 130 with the user account by assigning each image an image template identifier and associating the respective image template identifier with a user account identifier for the user account for the known user.

FRM 122 may store the data indicative of images 130 to enrolled images data store 128. In some examples, FRM 122 encrypts the data indicative of images 130 prior to storing the data indicative of images 130. The data indicative of images 130 may be stored locally on computing device 110 such that the data is not transmitted over a network to any other devices. Further, computing device 110 may provide the user with an opportunity to delete the data indicative of images 130.

FRM 122 may perform an authentication process for an unknown user after completing the enrollment process for the known user. In other words, FRM 122 may receive a request to authenticate an unknown user 138 of computing device 110. As one example, computing device 110 may operate in a reduced access mode prior to authenticating unknown user 138. In some instances, in the reduced access mode, computing device 110 may be in a locked state or may provide access to a limited set of features. Computing device 110 may operate in an increased access mode after authenticating the unknown user. For instance, in the increased access mode, computing device 110 may be in an unlocked state or may provide access to relative more features (e.g., an unrestricted set of features, such as any features or capabilities of computing device 110).

In one example, FRM 122 receives data indicative of an authentication image 140 of a face of an unknown user 138 from one or more of image capture devices 114. For example, unknown user 138 may face image capture devices 114 and press a button (e.g., a physical button or a graphical button displayed by PSD 112) to cause image captures devices 114 to capture authentication image 140. As another example, image capture devices 114 may automatically capture authentication image 140 in response to the user facing image capture devices 114. The data indicative of the image of the face of the unknown user may include the image itself or an image template representing characteristics of the unknown user's face.

Responsive to receiving the data indicative of the authentication image 140, FRM 122 may determine whether the unknown user 138 is the known user. In some examples, FRM 122 determines whether the unknown user 138 is the known user based on a comparison of the data indicative of authentication image 140 of the face of unknown user 138 and the data indicative of one or more of images 130 of the face of the known user. For example, FRM 122 may compare the data indicative of authentication image 140 of the face of unknown user 138 and the data indicative of one or more of images 130 of the face of the known user using a pose-independent (also referred to as pose invariant) technique or a pose-dependent technique.

In some examples, in a pose-dependent technique, FRM 122 determines whether the unknown user 138 is the known user based on the authentication image 140 and an image of images 130 that includes the face of the known user is a pose closest to the pose of the face of the unknown user in authentication image 140. In one example, FRM 122 determines a pose bucket of pose buckets 132 associated with authentication image 140 of unknown user 138. For example, FRM 122 may determine the pose bucket associated with image 140 based on characteristics or landmarks of the face of the unknown user, in a manner similar to determining the pose buckets associated with images 130. For instance, FRM 122 may determine the yaw angle and the pitch angle of the face in authentication image 140. Responsive to determining the yaw and pitch angles of the face in authentication image 140, FRM 122 may determine which of pose buckets 132 include the yaw and pitch angle of the face in authentication image 140. For instance, FRM 122 may determine the yaw and pitch angles of the face in authentication image 140 are 20 degrees and 0 degrees respectively. FRM 122 may determine that pose bucket 132CD is associated with a range of yaw angles from 15 to 25 degrees yaw and a range of pitch angles from −5 to 5 degrees. In such instances, FRM 122 may determine that authentication image 140 of the unknown user is associated with pose bucket 132CD in response to determining the yaw and pitch angles of the face in authentication image 140 are included in the range of yaw and pitch angles associated with pose bucket 132CD.

FRM 122 may determine an image from images 130 of the face of the known user that is included within the pose bucket associated with image 140 of the face of the unknown user. In other words, FRM 122 may determine which of images 130 has the closest pose to the pose of authentication image 140. In one example, FRM 122 determines that image 140 is associated with pose bucket 132CD and selects an image (e.g., 130G) of images 130 that is included within pose bucket 132CD. FRM 122 may determine whether user 138 is the known user by determining a similarity score for the selected image 130G, the similarity score indicating a similarity between image 130G and image 140.

Responsive to determining the similarity score for selected image 130G (e.g., the image included in the pose bucket 132CD that is associated with the image 140 of the unknown user), in some examples, FRM 122 determines whether the similarity score for image 130G satisfies (e.g., is greater than or equal to) a threshold similarity score. FRM 122 may determine unknown user 138 is the known user in response to determining that the similarity score for image 130G satisfies the threshold similarity score, and may determine that unknown user 138 is not the known user in response to determining that the similarity score for image 130G does not satisfy the threshold similarity score.

In some examples, FRM 122 determines whether unknown user 138 is the known user regardless of the pose. In other words, in some examples, FRM 122 utilizes pose invariant techniques to determine whether the unknown user 138 is the known user. For example, FRM 122 may determine a respective similarity score for each image of images 130, where the respective similarity score indicates a similarity between the corresponding image of images 130 and authentication image 140.

In one scenario, FRM 122 selects a single image of images 130 based on the respective similarity scores for images 130 to determine whether unknown user 138 is the known user. FRM 122 selects the single image of images 130 with the similarity score indicative of a closest match to authentication image 140. The score indicative of the closest match may be the lowest similarity score or the highest similarity score.

In some scenarios, FRM 122 selects two or more images of images 130 based on the respective similarity scores to determine whether unknown user 138 is the known user. In one scenario, FRM 122 determines a composite similarity score for two or more images 130. For instance, FRM 122 may determine the composite similarity score based on the average of the respective similarity scores for two or more of images 130 and may compare the composite similarity score to the threshold similarity score to determine whether unknown user 138 is the known user.

As another example, FRM 122 may compare each respective similarity score for the two or more images to the threshold similarity score. In such examples, FRM 122 may determine that unknown user 138 is the known user in response to determining that a threshold number (e.g., 100%, 80%, 60% etc.) of the selected images have a similarity score that satisfies the threshold similarity score. For instance, if the set of selected images include the three images of images 130 with the highest similarity scores, in some examples, FRM 122 determines that unknown user 138 is the known user in response to determining that the similarity score for two of the three selected images satisfies the threshold similarity score.

Responsive to determining that unknown user 138 is the known user, FRM 122 sets computing device 110 to an increased access mode. For instance, FRM 122 may unlock computing device 110 or enable additional features of computing device 110.

In another example, FRM 122 may cause computing device 110 to remain in the reduced access mode in response to determining that unknown user 138 is not a known user. In such example, FRM 122 may cause computing device 110 to remain locked or may limit the features of computing device 110 that unknown user 138 is permitted to use (e.g., emergency calling only, entering a camera mode, among others). In such examples, FRM 122 may cause computing device 110 to output data (e.g., via a user interface device, such as PSD 112) indicating one or more alternative authentication options, such as password or gesture entry, or fingerprint entry, among others, and/or providing another opportunity to authenticate using facial recognition.

While computing device 110 is described as enrolling images 130 of a known user and authenticating an unknown user 138, in some examples, one or more remote computing devices may perform all or a subset of the functionality described herein. In some examples, a computing device (e.g., computing device 110 or another computing device) may utilize user data associated with a user of computing device 110 only if the computing device receives permission from the user of the computing device to utilize the data. For example, before a computing device or computing system can collect or may make use of information associated with a user, the user may be provided with an opportunity to provide input to control whether programs or features of the computing device and/or computing system can collect and make use of user information. In addition, certain information may be treated in one or more ways before it is stored or used by the computing device and/or computing system, so that personally-identifiable information is removed. For example, a user's identity may be treated so that no personally identifiable information can be determined about the user. For instance, the computing device may store an image template for an image without storing the image itself, and may associate the image template with a user identifier that is not associated with any other user information. Thus, the user may have control over how information is collected about the user and used by the computing device and computing system.

In this way, techniques of this disclosure may enable computing device 110 to capture images of a known user that are included within several different pose buckets. By capturing and enrolling images in several different pose buckets, the computing device may increase the number of pose buckets that include images of the known user, which may enable the computing device may more accurately authenticate images of unknown users regardless of the pose bucket of an authentication image for the unknown user. For instance, increasing the number of pose buckets that include an enrolled image may increase the probability that the pose bucket associated with the authentication image of the unknown user is similar to the pose bucket that includes one or more of the enrolled images of the known user, which may reduce the probability of falsely rejecting the unknown user when the unknown user is in fact a known, authorized user, thus potentially improving the user experience. Further, reducing the probability of false rejections may reduce the number of authentication attempts (e.g., facial recognition, finger print recognition, PIN or passcodes, etc.) used for the computing device to enter an increased access mode, which may reduce the amount of processing cycles utilized by the processor and improve battery life. In some instance, the described techniques may reduce the probability of falsely authenticating the unknown user when the unknown user is not a known, authorized user, which may increase security of the computing device.

Figure 2:
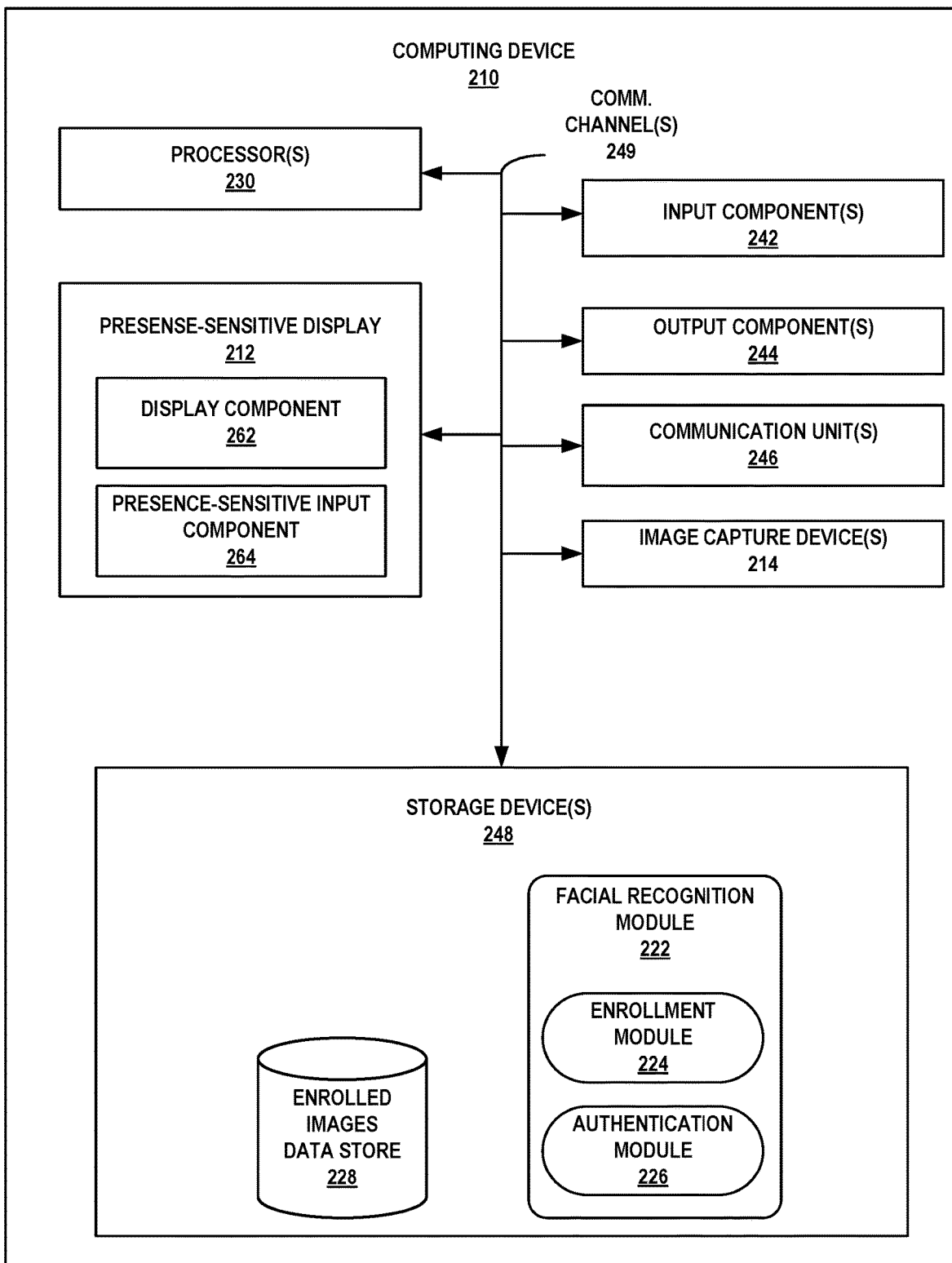
FIG. 2 is a block diagram illustrating an example computing device that performs facial recognition to authenticate a user, in accordance with one or more aspects of the present disclosure.

FIG. 2 is a block diagram illustrating an example computing device that is configured to dynamically generate task shortcuts, in accordance with one or more aspects of the present disclosure. Computing device 210 is a more detailed example of computing device 110 of FIG. 1. FIG. 2 illustrates only one particular example of computing device 210, and many other examples of computing device 210 may be used in other instances and may include a subset of the components included in example computing device 210 or may include additional components not shown in FIG. 2.

As shown in the example of FIG. 2, computing device 210 includes PSD 212, one or more image capture devices 214, one or more processors 230, one or more input components 242, one or more output components 244, one or more communication units 246, and one or more storage devices 248. Storage devices 248 of computing device 210 include FRM 222 and enrolled images data store 228.

Communication channels 249 may interconnect each of the components 212, 214, 230, 242, 244, 246, and/or 248 for inter-component communications (physically, communicatively, and/or operatively). In some examples, communication channels 249 may include a system bus, a network connection, one or more inter-process communication data structures, or any other components for communicating data (also referred to as information).

Image capture devices 214 may include one or more cameras, such as digital cameras, still cameras, motion picture cameras, and the like. Image capture devices 214 may include any other devices capable of capturing and storing still or moving images. In some examples, image capture devices 214 may be capable of digitally recording images via an electronic image sensor. Image capture devices 214 may include one or more devices configured to detect visible light (e.g., visible light cameras), one or more devices configured to detect near-infrared light (e.g., near-infrared cameras), or a combination therein. In some examples, image capture devices 214 may generate image data indicative of 2-dimensional images, data indicative of 3-dimensional images, or a combination therein. In this way, a plurality of image capture devices 214 may capture visible light, near-infrared light, or a combination therein, and may generate image data indicative of 2-dimensional images, 3-dimensional images, or both.

One or more communication units 246 of computing device 200 may communicate with external devices by transmitting and/or receiving data. For example, computing device 200 may use one or more of communication units 246 to transmit and/or receive radio signals on a radio network such as a cellular radio network. In some examples, communication units 246 may transmit and/or receive satellite signals on a satellite network such as a Global Positioning System (GPS) network. Examples of communication units 246 include a network interface card (e.g. such as an Ethernet card), an optical transceiver, a radio frequency transceiver, a GPS receiver, or any other type of device that can send and/or receive information. Other examples of communication units 246 may include short wave radios (e.g., NFC, BLUETOOTH (including BLE)), GPS, 3G, 4G, 5G, and WIFI radios found in mobile devices as well as Universal Serial Bus (USB) controllers and the like.

One or more input components 242 of computing device 210 may receive input. Examples of input are tactile, audio, kinetic, and optical input, to name only a few examples. Input components 242 of computing device 210 include, in one example, a mouse, keyboard, voice responsive system, video camera, buttons, control pad, microphone or any other type of device for detecting input from a human or machine. In some examples, input component 242 may be a presence-sensitive input component, which may include a presence-sensitive screen, touch-sensitive screen, etc.

One or more output components 244 of computing device 210 may generate output. Examples of output are tactile, audio, and video output. Output components 244 of computing device 210, in some examples, include a presence-sensitive screen, sound card, video graphics adapter card, speaker, cathode ray tube (CRT) monitor, liquid crystal display (LCD), or any other type of device for generating output to a human or machine. Output components may include display components such as cathode ray tube (CRT) monitor, liquid crystal display (LCD), Light-Emitting Diode (LED) or any other type of device for generating tactile, audio, and/or visual output.

In some examples, PSD 212 of computing device 210 may include functionality of input component 242 and/or output components 244. In the example of FIG. 2, PSD 212 may include a presence-sensitive input component 264, such as a presence-sensitive screen or touch-sensitive screen. In some examples, presence-sensitive input component 264 may detect an object at and/or near the presence-sensitive input component. As one example range, presence-sensitive input component 264 may detect an object, such as a finger or stylus that is within two inches or less of presence-sensitive input component 264. Presence-sensitive input component 264 may determine a location (e.g., an (x,y) coordinate) of the presence-sensitive input component at which the object was detected. In another example range, presence-sensitive input component 264 may detect an object two inches or less from presence-sensitive input component 264 and other ranges are also possible. Presence-sensitive input component 264 may determine the location of presence-sensitive input component 264 selected by a user's finger using capacitive, inductive, and/or optical recognition techniques.

In some examples, PSD 212 may also provide output to a user using tactile, audio, or video stimuli as described with respect to output component 244. For instance, PSD 212 may include display component 262 that displays a graphical user interface. Display component 262 may be any type of output component that provides visual output, such as described with respect to output components 244. While illustrated as an integrated component of computing device 210, PSD 212 may, in some examples, be an external component that shares a data or information path with other components of computing device 210 for transmitting and/or receiving input and output. For instance, PSD 212 may be a built-in component of computing device 210 located within and physically connected to the external packaging of computing device 210 (e.g., a screen on a mobile phone). In another example, PSD 212 may be an external component of computing device 210 located outside and physically separated from the packaging of computing device 210 (e.g., a monitor, a projector, etc. that shares a wired and/or wireless data path with a tablet computer). In some examples, PSD 212, when located outside of and physically separated from the packaging of computing device 210, may be implemented by two separate components: a presence-sensitive input component 264 for receiving input and a display component 262 for providing output.

One or more storage components 248 within computing device 210 may store information for processing during operation of computing device 210 (e.g., computing device 210 may store data accessed by FRM 222 during execution at computing device 210). In some examples, storage component 248 is a temporary memory, meaning that a primary purpose of storage component 248 is not long-term storage. Storage components 248 on computing device 210 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage components 248, in some examples, also include one or more computer-readable storage media. Storage components 248 in some examples include one or more non-transitory computer-readable storage mediums. Storage components 248 may be configured to store larger amounts of information than typically stored by volatile memory. Storage components 248 may further be configured for long-term storage of information as non-volatile memory space and retain information after power on/off cycles. Examples of non-volatile memories include magnetic hard discs, optical discs, flash memories, or forms of electrically programmable memories (EPROM) or electrically erasable and programmable (EEPROM) memories. Storage components 248 may store program instructions and/or information (e.g., data) associated with FRM 222. Storage components 248 may include a memory configured to store data or other information associated with FRM 222 and enrolled images data store 228.

One or more processors 230 may implement functionality and/or execute instructions associated with computing device 210. Examples of processors 230 include application processors, display controllers, auxiliary processors, one or more sensor hubs, and any other hardware configure to function as a processor, a processing unit, or a processing device. FRM 222 may be operable by processors 230 to perform various actions, operations, or functions of computing device 210. For example, processors 230 of computing device 210 may retrieve and execute instructions stored by storage components 248 that cause processors 230 to perform the operations described herein that are attributed to FRM 222. The instructions, when executed by processors 230, may cause computing device 210 to store information within storage components 248.

FRM 222 may include all functionality of FRM 122 of computing device 110 of FIG. 1 and may perform similar operations as FRM 122 for performing facial recognition to authenticate a user of computing device 210. FRM 222 may include an enrollment module 224 and an authentication module 226.

In some examples, enrollment module 224 may perform an enrollment process to associate images of a known user of computing device 210 with a user account for the known user. In some examples, enrollment module 224 may perform the enrollment process one time for a given user account, for instance, when setting up a new account.

During the enrollment phase, image capture devices 214 captures one or more images 130 (of FIG. 1) of a known user (e.g., a user logged in to a user account associated) of computing device 210 and generates image data indicative of each of the images. Enrollment module 224 of FRM 222 may receive the image data from image capture device 214 and analyze the image data to assign each of images 130 to one or more pose buckets 132 (of FIG. 1).

Enrollment module 224 may determine which of pose buckets 132 is associated with an image based on characteristics or landmarks of the face of the known user included in the image. For instance, enrollment module 224 may detect landmarks in the images of the unknown user's face, such as the user's eyes, nose, and mouth, and may determine the yaw and pitch angle of the face based on the landmarks. For example, enrollment module 224 may receive image data indicative of image 130A and determine the yaw angle of the user's face in image 130A is approximately 0 degrees and the pitch angle of the user's face in image 130A is approximately 0 degrees based on the landmarks in image 130A. Enrollment module 224 may determine that pose bucket 132CC includes a range of yaw angles from −5 degrees to 5 degrees and a range of pitch angles from −5 degrees to 5 degrees (e.g., pose bucket 132CC is centered on 0 degrees yaw and 0 degrees pitch). In such examples, enrollment module 224 may determine that the yaw and pitch angles of the user's face in image 130A are within the range of pitch and yaw angles for pose bucket 132CC, such that enrollment module 224 determines that image 130A should be included within pose bucket 132CC. In some examples, enrollment module 224 may determine the amount of roll of the user's face in image 130A. For example, enrollment module 224 may determine which of pose buckets 132 include image 130A based on the yaw angle, pitch angle, and roll of the user's face in image 130A.

In some examples, enrollment module 224 determines whether image 130A should be included in a plurality of pose buckets 132. For example, enrollment module 224 may include image 130A within a given pose bucket when the yaw and pitch angles of image 130A are within a predefined distance (e.g., a radius of 10 degrees) of the center of the given pose bucket 132. For instance, enrollment module 224 may determine that the yaw and pitch angles of the user's face in image 130A are 0 degrees and 0 degrees, respectively. In one instance, the predefined distance may be 10 degrees and pose bucket 132BC may be centered at 0 degrees yaw and 10 degrees pitch, such that enrollment module 224 may determine that the yaw and pitch angles of image 130A lie within the predefined distance of the center of pose bucket 132BC. In such instances, enrollment module 224 may include image 130A in pose bucket 132BC. Similarly, enrollment module 224 may determine that the yaw and pitch angles for image 130A are within the predefined distance of the center of pose buckets 132CB, 132CD, and 132DC, and include image 130A in pose buckets 132CB, 132CD, and 132DC in addition to pose buckets 132CC and 132BC.

In some examples, enrollment module 224 receives image data for image 130B after receiving the image data for image 130A. Enrollment module 224 may determine whether to include image 130B in any of pose buckets 132. Enrollment module 224 may determine the yaw angle of the user's face in image 130B is approximately 0 degrees and the pitch angle of the user's face in image 130B is approximately 19 degrees based on the landmarks in image 130B. Enrollment module 224 may determine that pose bucket 132AC includes a range of yaw angles from −5 degrees to 5 degrees and a range of pitch angles from 15 degrees to 25 degrees (e.g., pose bucket 132AC is centered on 0 degrees yaw and 20 degrees pitch). In such examples, enrollment module 224 may determine that the yaw and pitch angles of the user's face in image 130B are within the range of pitch and yaw angles for pose bucket 132AC. Enrollment module 224 may determine whether pose bucket 132AC includes one of images 130 and may include image 130B in pose bucket 132AC in response to determining that pose bucket 132AC does not already include an image.

Enrollment module 224 may determine whether to include image 130B in any other pose buckets 132. For example, enrollment module 224 may determine whether the yaw and pitch angles for image 130B are within the predefined distance of the center of other pose buckets 132. For instance, enrollment module 224 may determine that the predefined distance is 10 degrees and pose bucket 132BC is centered at 0 degrees yaw and 10 degrees pitch, such that enrollment module 224 may determine that the yaw and pitch angles of image 130B (e.g., 0 degrees yaw, 19 degrees pitch) lie within the predefined distance of the center of pose bucket 132BC. Enrollment module 224 may determine whether to include image 130B in pose bucket 132BC in response to determining that the yaw and pitch angles for image 130B are within the predefined threshold of the center of pose bucket 132BC.

In some examples, enrollment module 224 determines that pose bucket 132BC already includes image 130A and determines whether to replace image 130A with image 130B in pose bucket 132BC. In one example, enrollment module 224 may determine whether to replace image 130A with image 130B in pose bucket 132BC based on a distance between the center of pose bucket 132BC and the respective yaw and pitch angles for images 130A, 130B. For example, enrollment module 224 may determine the yaw and pitch angles for image 130A are 0 degrees, 0 degrees; the yaw and pitch angles for image 130B are 0 degrees, 19 degrees, and the yaw and pitch angles for the center of pose bucket 132BC are 0 degrees, 10 degrees. In such examples, enrollment module 224 may determine that image 130B is closer to the center of pose bucket 132BC than image 130A, and may replace image 130A with image 130B within pose bucket 132BC.

In some examples, enrollment module 224 may determine whether to include image 130A or image 130B within pose bucket 132BC based on the order of receiving the image data for images 130A, 130B. For example, enrollment module 224 may include the oldest image (e.g., the image that was received first) within pose bucket 132BC. In such examples, enrollment module 224 may determine that image 130A should be included within pose bucket 132BC as the image data for image 130A was received first. In another example, enrollment module 224 may include the most recent image within pose bucket 132BC. In these examples, enrollment module 224 may determine that image 130B should be included within pose bucket 132BC.

Enrollment module 224 may receive data indicative images 130 from image capture devices 214 and determine whether a threshold number of pose buckets 132 include one of images 130. For example, enrollment module 224 may determine a number of pose buckets 132 that include images 130 of the face of the known user. Responsive to determining the number of pose buckets 132, enrollment module 224 determines whether the number of pose buckets that include images 130 satisfies (e.g., is greater than or equal to) a threshold number of pose buckets. For example, enrollment module 224 may determine that the number of pose buckets 132 that include images 130 satisfies the threshold number of pose buckets in response to determining that images 130 are included within at least 75% of pose buckets 132. Responsive to determining that the number of pose buckets that include images 130 does not satisfy the threshold number of pose buckets, enrollment module 224 may cause image capture devices 214 to capture one or more additional images 130 for the enrollment process.

In some examples, enrollment module 224 may associate data indicative of the images 130 with a user account for the known user in response to determining that the number of pose buckets that include images 130 satisfies the threshold number of pose buckets. In some examples, the data indicative of images 130 may include the images themselves or image templates for each respective image. The image templates may include a vector with a plurality of element values (e.g., 50 values, 100 values, 500 values, etc.). In some examples, each element value of the vector corresponds to a feature of the user's face (e.g., distance between the eyes, nose shape, etc.). Alternatively or additionally, element values of the vector may be generated through a non-linear machine learned model trained to generate outputs indicative of a facial identity. As one example, enrollment module 224 may apply a trained facial recognition model to the plurality of images 130 and output an image template (e.g., a vector) for each respective image 130. In some examples, enrollment module 224 associates the data indicative of images 130 with the user account by assigning each image template an image template identifier and associating the respective image template identifier with a user account identifier for the user account for the known user.

Enrollment module 224 may store the data indicative of images 130 (e.g., the images themselves or the image templates) to enrolled images data store 228. In some examples, enrollment module 224 encrypts the data indicative of images 130 prior to storing the data indicative of images 130. The data indicative of images 130 may be stored locally on computing device 210 such that the data is not transmitted over a network to any other devices. Further, computing device 210 may provide the user with an opportunity to delete the data indicative of images 130.

Authentication module 226 may periodically perform an authentication process for an unknown user to determine whether an unknown user is, in fact, a known user. For example, computing device 210 may operation in a reduced access mode prior to performing an authentication process. Authentication module 226 may perform the authentication process to determine whether to operate in an increased access mode, for instance, to unlock computing device 220, authorize a transaction (e.g., when using computing device 210 to make a payment), log in to a website or application, or otherwise perform an action requiring increased access to computing device 210.

In some scenarios, authentication module 226 performs the authentication process in response to receiving data indicative of an authentication image 140 of a face of an unknown user 138 (of FIG. 1) from one or more of image capture devices 214. In one instance, image capture devices 214 may capture one or more images of unknown user 138 in response to receiving a user input (e.g., button press, gesture, etc.) to capture the image(s). In another instance, image capture devices 214 may capture one or more images automatically in response to detecting a person near computing device 210. Image capture devices 214 may generate image data indicative of an authentication image 140 and output the image data to authentication module 226. The data indicative of the image of the face of the unknown user may include the image itself or an image template representing characteristics of the unknown user's face.

Responsive to receiving the data indicative of the authentication image 140, authentication module 226 may determine whether unknown user 138 is a known user. Authentication module 226 may determine whether unknown user 138 is a known user based on authentication image 140 and one or more enrollment images 130. In some instances, authentication module 226 determines whether unknown user 138 is a known user using a pose-independent (also referred to as pose invariant) technique or a pose-dependent technique.

In some pose-dependent examples, authentication module 226 determines whether the unknown user 138 is the known user based on the authentication image 140 and a particular image of images 130 that includes the face of the known user in a pose closest to the pose of the face of unknown user 138 in authentication image 140. In one example, the particular image 130 that includes the face of the known user in the pose closest to the pose of the face in authentication image 140 may be the particular image of images 130 that is included in the same pose bucket as a pose bucket 132 associated with authentication image 140.

Authentication module 226 may determine a pose bucket of pose buckets 132 associated with authentication image 140 of unknown user 138. For example, authentication module 226 may determine the pose bucket associated with image 140 based on characteristics or landmarks of the face of the unknown user. For instance, authentication module 226 may determine the yaw angle and the pitch angle of the face in authentication image 140. Responsive to determining the yaw and pitch angles of the face in authentication image 140, authentication module 226 may determine which of pose buckets 132 include the yaw and pitch angle of the face in authentication image 140, and determine that pose bucket (e.g., pose bucket 132CD) is the pose bucket associated with authentication images 140. In some instances, authentication module 226 may determine a roll of the face of unknown user 138 in authentication image 140. Authentication module 226 may determine which of pose buckets 132 is associated with authentication image 140 based on the yaw angle, the pitch angle, and the roll of the face in authentication image 140.

Authentication module 226 may determine which of images 130 is included within the pose bucket associated with authentication image 140 (e.g., pose bucket 132CD). In an example where pose bucket 132CD is associated with authentication image 140, authentication module 226 may query enrolled images data store 228 and determine that image 130G is included within pose bucket 132CD. Responsive to determining that image 130G is included within the pose bucket associated with authentication image 140, authentication module 226 may determine whether user 138 is the known user by determining a similarity score for the selected image 130G. In some examples, the similarity score for image 130G indicates a similarity between image 130G and authentication image 140.

Authentication module 226 may determine a similarity score for image 130G based on the data indicative of image 130G and the data indicative of authentication image 140. In some examples, the data indicative of image 130G includes an image template for image 130G. Such an image template may be represented as a vector and may be generated by a trained facial recognition model. The vector may include a plurality of element values that each correspond to a respective feature of the user's face (e.g., distance between the eyes, nose shape, etc.). Similarly, the data indicative of authentication image 140 may include a vector generated in a similar manner. In some examples, authentication module 226 determines the similarity score by calculating an angle between a vector representing image 130G and a vector representing authentication image 140. As another example, authentication module 226 may determine the similarity score for image 130G by determining a cosine similarity between a vector representing image 130G and a vector representing authentication image 140.

In some examples, authentication module 226 determines whether the similarity score for image 130G satisfies a threshold similarity score. As one example, authentication module 226 determines the similarity score for image 130G by determining the angle between the vector representing image 130G and the vector representing authentication image 140, and determines that the similarity score for image 130G satisfies the threshold similarity score in response to determining that the similarity score is less than the threshold similarity score. As another example, authentication module 226 determines the similarity score for image 130G by determining the cosine similarity between the vector representing image 130G and the vector representing authentication image 140, and determines that the similarity score for image 130G satisfies the threshold similarity score in response to determining that the similarity score is greater than the threshold similarity score.

Authentication module 226 may determine unknown user 138 is the known user in response to determining that the similarity score for image 130G satisfies the threshold similarity score. Similarly, authentication module 226 may determine that unknown user 138 is not the known user in response to determining that the similarity score for image 130G does not satisfy the threshold similarity score.

In some pose-independent examples, authentication module 226 determines a respective similarity score for each of images 130G to determine whether the unknown user 138 is the known user. The respective similarity score indicates a similarity between the corresponding image of images 130 and authentication image 140. As discussed above, authentication module 226 may determine a respective similarity score for each of images 130 based on the data indicative of the respective images 130 and the data indicative of authentication image 140. In some examples, the data indicative of images 130 includes a respective image template. Such an image template may be represented as a vector and may be generated by a trained facial recognition model. The vector may include a plurality of element values that each correspond to a respective feature of the user's face. In such examples, the data indicative of authentication image 140 may include a vector that includes a plurality of element values that each correspond to a respective feature of the face of unknown user 138. In some scenarios, authentication module 226 determines the respective similarity score for each of images 130 by calculating an angle between the respective vector and the vector representing authentication image 140. As another example, authentication module 226 may determine the respective similarity score for each of images 130 by determining a cosine similarity between the respective vector for each of images 130 and the vector representing authentication image 140.

In one pose-independent example, authentication module 226 selects a single image of images 130 based on the respective similarity scores for images 130 to determine whether unknown user 138 is the known user. Authentication module 226 selects the single image of images 130 with the similarity score indicative of a closest match to authentication image 140. In some examples, authentication module 226 determines the respective similarity scores for images 130 based on an angle between each vector representing a respective image of images 130 and the vector representing authentication image 140 and determines that the score indicative of the closest match is the lowest similarity score (e.g., the smaller angle between two vectors the closer the vectors are to one another). In another example, authentication module 226 determines the respective similarity scores for images 130 based on a cosine similarity between each vector representing a respective image of images 130 and the vector representing authentication image 140 and determines that the score indicative of the closest match is the highest similarity score (e.g., the larger cosine value between two vectors the more the vectors are more similar).

In some scenarios, authentication module 226 selects two or more images of images 130 based on the respective similarity scores to determine whether unknown user 138 is the known user. In one scenario, authentication module 226 determines a composite similarity score for two or more images 130. In some instances, authentication module 226 may determine the composite similarity score based on the highest similarity scores for two or more images 130 or the lowest similarity scores for two or more images 130. In one instance, authentication module 226 may determine the composite similarity score based on the average of the respective similarity scores for two or more of images 130 and may compare the composite similarity score to the threshold similarity score to determine whether unknown user 138 is the known user.

As another example, authentication module 226 may compare each respective similarity score for the two or more images to the threshold similarity score. In such examples, authentication module 226 may determine that unknown user 138 is the known user in response to determining that a threshold number (e.g., 100%, 80%, 60% etc.) of the selected images have a similarity score that satisfies the threshold similarity score. For instance, authentication module 226 may determine that the set of selected images include the three images of images 130 with the highest similarity scores, and may determine that unknown user 138 is the known user in response to determining that the similarity score for two of the three selected images satisfies the threshold similarity score.

Responsive to determining that unknown user 138 is the known user, authentication module 226 sets computing device 210 to an increased access mode. For instance, authentication module 226 cause computing device 210 to enter the increased access mode by unlocking computing device 210. As another example, authentication module 226 may cause computing device 210 to enter the increased access mode by enabling computing device 210 to authorize a payment, log-in to a website or application, or otherwise perform an action requiring increased access to computing device 210.

In some instances, authentication module 226 may cause computing device 210 to remain in the reduced access mode in response to determining that unknown user 138 is not a known user. In such examples, authentication module 226 may cause computing device 210 to remain locked, deny a payment, refrain from logging in to a website or application, or otherwise refrain from increasing access to computing device 210. In such examples, authentication module 226 may cause computing device 210 to output data (e.g., via a user interface device, such as PSD 212) indicating one or more alternative authentication options, such as password or gesture entry, or fingerprint entry, among others, and/or providing another opportunity to authenticate using facial recognition.

Figure 3:
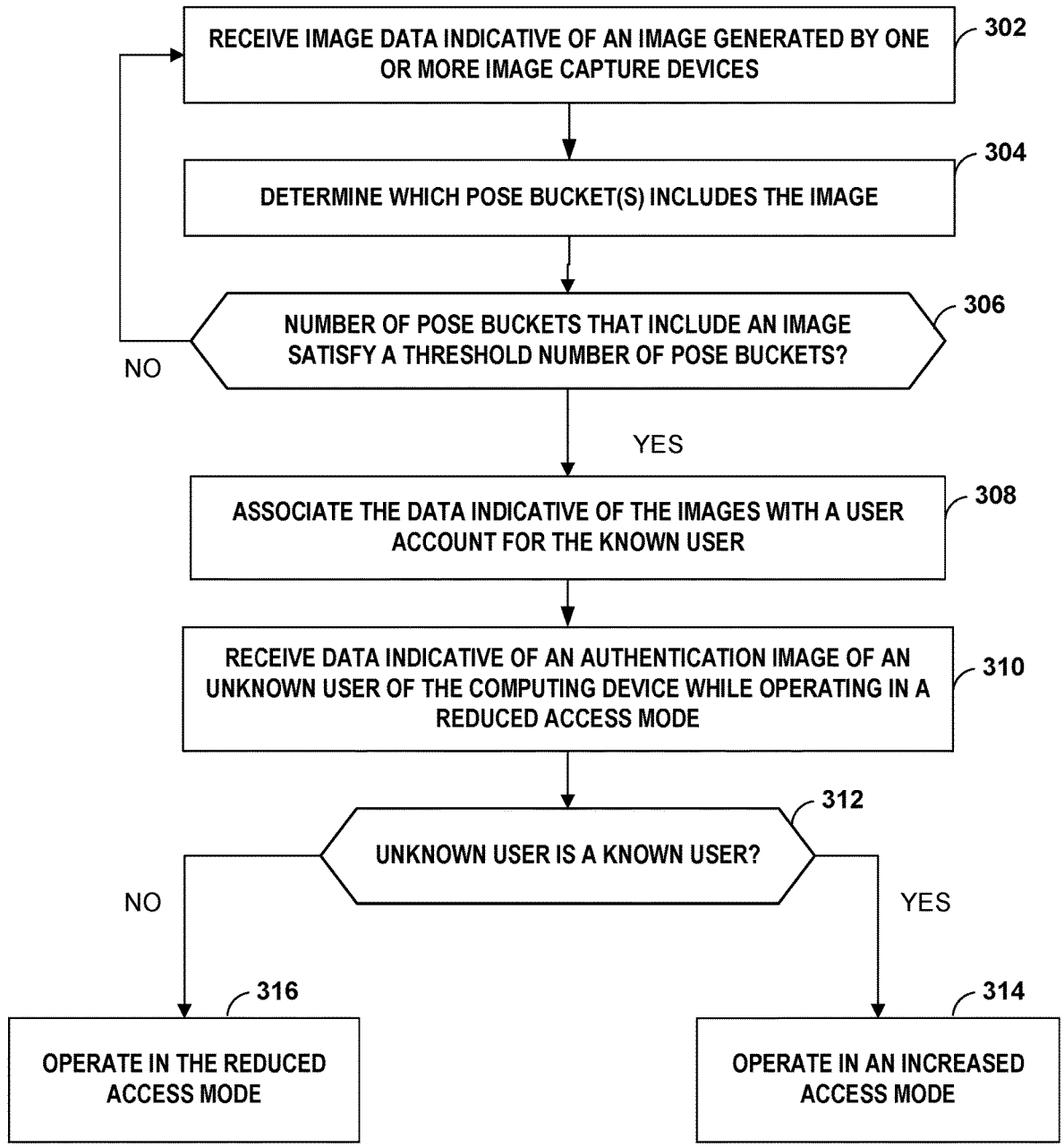
FIG. 3 is a flowchart illustrating example operations performed by an example computing device, in accordance with one or more aspects of the present disclosure.

FIG. 3 is a flowchart illustrating example operations performed by an example computing device that performs facial recognition to authenticate a user, in accordance with one or more aspects of the present disclosure. FIG. 3 is described in the context of FIG. 1.

Computing device 110 receives image data indicative an image generated by one or more image capture devices 114 (302). For example, image capture devices 114 may capture image 130A (e.g., in 2-D or 3-D) and may output data indicative of image 130A.

In some examples, computing device 110 determines which of pose buckets 132 includes image 130A (304). Computing device 110 may determine which of pose buckets includes image 130A based on characteristics or landmarks (e.g., eyes, nose, mouth) of the face of the known user included in image 130A. For example, computing device 110 may determine the yaw angle and the pitch angle of the user's face in image 130A. In one example, computing device 110 determines the pose bucket for which the range of pitch and yaw angles include the yaw and pitch angles for image 130A, and determines that pose bucket (e.g., 132CC) includes image 130A.

Computing device 110 may determine whether the number of pose buckets 132 that include images 130 satisfies the threshold number of pose buckets (306). For example, computing device 110 may determine that the number of pose buckets 132 that include images 130 satisfies the threshold number of pose buckets in response to determining that images 130 are included within at least 75% of pose buckets 132.

In some scenarios, computing device 110 associates the data indicative of images 130 with a user account for the known user (308) in response to determining the number of pose buckets 132 that include images 130 satisfies the threshold number of pose buckets ("YES" branch of 306). For example, computing device 110 may store data indicative of images 130 in enrolled images data store 128. For instance, the data indicative of images 130 may include images 130 themselves or image templates (e.g., vectors) for each of images 130. Computing device 110 may cause image capture device 114 to capture additional images of the known user (302) in response to determining that the number of pose buckets 132 that include images 130 does not satisfy the threshold number of pose buckets ("NO" branch of 306).

Computing device 110 may receive data indicative of authentication image 140 of an unknown user 138 of computing device 110 while operating in a reduced access mode (310). For example, image capture device 114 may capture an image 140 of unknown user 138 and generate image data indicative of image 140. Image capture device 114 may capture authentication image 140 automatically or in response to a user input.

In one example, computing device 110 determines whether unknown user 138 is a known user (312). Computing device 110 may determine whether unknown user 138 is a known user based on authentication image 140 and one or more images 130. For example, computing device 110 may determine whether unknown user 138 is a known user using a pose-independent technique or a pose-dependent technique. In some examples, computing device 110 determines a respective similarity score for one or more image 130, each respective similarity score indicating a similarity between a respective image of images 130 and authentication image 140. As one example, computing device 110 determines a similarity score between a single image of images 130 and authentication image 140. In such examples, computing device 110 may determine whether unknown user 138 is the known user by determining whether the similarity score for the single image satisfies a threshold similarity score.

As another example, computing device 110 determines a similarity score for each of images 130. In such examples, computing device 110 may determine whether unknown user 138 is the known user based on the similarity scores for two or more of images 130. For instance, computing device 110 may determine a composite similarity score for two or more images based on the respective individual similarity scores for two or more images 130. As another example, computing device 110 may determine whether the similarity score for a predetermined number of images 130 satisfies the threshold similarity score.

Responsive to determining that unknown user 138 is the known user ("YES" branch of 312), computing device 110 may execute an increased access mode (314). As one example, computing device 210 may execute the increased access mode by unlocking computing device 210. As another example, computing device may enter the increased access mode by authorizing a payment, logging in to a website or application, or otherwise performing an action requiring increased access to computing device 110.

In some instances, computing device 110 remains in the reduced access mode (316) in response to determining that unknown user 138 is not a known user ("NO" branch of 312). In one instance, computing device 110 may remain locked, deny a payment, refrain from logging in to a website or application, or otherwise refrain from increasing access to computing device 210. In such examples, computing device 210 may output data (e.g., via a user interface device, such as PSD 112) indicating one or more alternative authentication options, such as password or gesture entry, or fingerprint entry, among others, and/or providing another opportunity to authenticate using facial recognition.

In one or more examples, the functions described may be implemented in hardware, hardware and software, hardware and firmware, or any combination thereof. If implemented in software, the functions may be stored on or transmitted over, as one or more instructions or code, a computer-readable medium and executed by a hardware-based processing unit. Computer-readable medium may include computer-readable storage media or mediums, which corresponds to a tangible medium such as data storage media, or communication media including any medium that facilitates transfer of a computer program from one place to another, e.g., according to a communication protocol. In this manner, computer-readable medium generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other storage medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage mediums and media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable medium.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various embodiments have been described. These and other embodiments are within the scope of the following claims.

What is claimed is:

1. A method comprising:
performing, by at least one processor of a computing device, an enrollment process for a known user by at least:
receiving, by the at least one processor, data indicative of a plurality of images of a face of the known user;
determining, by the at least one processor, a number of pose buckets of a plurality of pose buckets that include the plurality of images of the face of the known user, wherein:
each of the plurality of images of the face of the known user is included in at least one pose bucket from a plurality of pose buckets, and
each pose bucket from the plurality of pose buckets is associated with a respective range of pitch angles of the face of the known user and a respective range of yaw angles of the face of the known user;
determining, by the at least one processor, whether the number of pose buckets satisfies a threshold number of pose buckets; and
responsive to determining that the number of pose buckets satisfies a threshold number of pose buckets, associating, by the at least one processor, the data indicative of the plurality of images with a user account for the known user;
subsequent to performing the enrollment process and while the computing device is in a reduced access mode:
receiving, by the at least one processor, data indicative of an image of a face of an unknown user of the computing device; and
determining, by the at least one processor, whether the unknown user is the known user of the computing device by at least comparing the data indicative of the image of the face of the unknown user to data indicative of one or more images of the plurality of images of the face of the known user; and
responsive to determining that the unknown user is the known user, setting, by the at least one processor, the computing device to an increased access mode.

2. The method of claim 1, further comprising:
selecting, by the at least one processor, from the plurality of images of the face of the known user, an image included in a particular pose bucket of the plurality of pose buckets, wherein the particular pose bucket is associated with the image of the face of the unknown user, and
wherein determining whether the unknown user is the known user is based on the image of the face of the unknown user and the selected image of the face of the known user.

3. The method of claim 2, further comprising:
determining, by the at least one processor, a similarity score indicating a similarity between the image of the face of the unknown user and the selected image of the face of the known user; and
determining, by the computing device, the unknown user is the known user in response to determining that the similarity score satisfies a threshold similarity score.

4. The method of claim 1, further comprising:
determining, by the at least one processor, based on the image of the face of the unknown user and each image of the plurality of images of the face of the known user, a respective similarity score for each image of the plurality of images of the face of the known user, wherein each similarity score indicates a similarity between the image of the face of the unknown user and the respective image of the plurality of images of the face of the known user,
wherein determining whether the unknown user is the known user is based on the respective similarity score for the one or more images of the plurality of images of the face of the known user.

5. The method of claim 4, further comprising:
determining, by the at least one processor, based on the respective similarity scores, a highest ranked image of the plurality of images of the face of the known user,
wherein determining whether the unknown user is the known user is based on the highest ranked image of the plurality of images of the face of the known user.

6. The method of claim 4, further comprising:
determining, by the at least one processor, based on the similarity scores for two or more images of the plurality of images of the face of the known user, a composite similarity score,
wherein determining whether the unknown user is the known user comprises determining, by the at least one processor, the unknown user is the known user in response to determining that the composite similarity score satisfies a threshold similarity score.

7. The method of claim 4, wherein determining whether the unknown user is the known user comprises determining, by the at least one processor, the unknown user is the known user in response to determining that the respective similarity score for each of two or more images of the face of the known user satisfies a threshold similarity score.

8. The method of claim 1, further comprising:
receiving, by the at least one processor, a first image of the plurality of images, wherein a pitch angle and a yaw angle of the first image lie within a range of pitch angles and yaw angles associated with a particular pose bucket;
receiving, by the at least one processor, a second image of the plurality of images, wherein a pitch angle and a yaw angle of the second image lie within the range of pitch angles and yaw angles associated with the particular pose bucket; and
determining, by the at least one processor, whether to include the first image or the second image in the particular pose bucket.

9. The method of claim 8, wherein determining whether to include the first image or the second image in the particular pose bucket includes:
determining, by the at least one processor, a center of the particular pose bucket;
determining, by the at least one processor, based on the pitch angle and the yaw angle of the first image and the pitch angle and the yaw angle of the second image, that the second image is closer to the center of the particular pose bucket; and
determining to include the second image in the particular pose bucket in response to determining that the second image is closer to the center of the particular pose bucket.

10. The method of claim 1, wherein receiving the data indicative of the plurality of images of the face of the known user comprises receiving, by the at least one processor, from a plurality of cameras, data indicative of 3-dimensional images of the face of the known user.

11. The method of claim 1,
wherein receiving the data indicative of the image of the face of the unknown user comprises receiving data indicative of a 2-dimensional image and data indicative of a 3-dimensional image of the face of the unknown user,
wherein the plurality of images of the face of the known user includes a plurality of 2-dimensional images of images of the face of the known user and a plurality of 3-dimensional images of images of the face of the known user, and
determining whether the unknown user is the known user is based on the 2-dimensional image of the face of the unknown user, the 3-dimensional image of the face of the unknown user, one or more 2-dimensional images of the plurality of 2-dimensional images of the face of the known user, and one or more 3-dimensional images of the plurality of 3-dimensional images of the face of the known user.

12. A computing device comprising:
a memory that stores instructions; and
one or more processors to:
perform an enrollment process for a known user of a computing device by causing the one or more processors to at least:
receive data indicative of a plurality of images of a face of the known user; determine a number of pose buckets of a plurality of pose buckets that include the plurality of images of the face of the known user, wherein:
each of the plurality of images of the face of the known user is included in at least one pose bucket from a plurality of pose buckets, and
each pose bucket from the plurality of pose buckets is associated with a respective range of pitch angles of the face of the known user and a respective range of yaw angles of the face of the known user;
determine whether the number of pose buckets satisfies a threshold number of pose buckets; and
responsive to determining that the number of pose buckets satisfies a threshold number of pose buckets, associate the data indicative of the plurality of images with a user account for the known user;
subsequent to performing the enrollment process and while the computing device is in a reduced access mode:
receive data indicative of an image of a face of an unknown user of the computing device; and
determine whether the unknown user is the known user of the computing device by at least comparing the data indicative of the image of the face of the unknown user to data indicative of one or more images of the plurality of images of the face of the known user; and
responsive to determining that the unknown user is the known user, set the computing device to an increased access mode.

13. The computing device of claim 12, wherein the one or more processors further execute the instructions to:
select, from the plurality of images of the face of the known user, an image included in a particular pose bucket of the plurality of pose buckets,
wherein the particular pose bucket is associated with the image of the face of the unknown user, and
wherein the instructions that cause the one or more processors to determine whether the unknown user is the known user further cause the one or more processors to determine whether the unknown user is the known user based on the image of the face of the unknown user and the selected image of the face of the known user.

14. The computing device of claim 12, wherein the one or more processors further execute the instructions to:

determine, based on the image of the face of the unknown user and each image of the plurality of images of the face of the known user, a respective similarity score for each image of the plurality of images of the face of the known user, wherein each similarity score indicates a similarity between the image of the face of the unknown user and the respective image of the plurality of images of the face of the known user, wherein the instructions that cause the one or more processors to determine whether the unknown user is the known user further cause the one or more processors to determine whether the unknown user is the known user based on the respective similarity score for the one or more images of the plurality of images of the face of the known user.

15. A non-transitory computer-readable storage medium encoded with instructions that, when executed by one or more processors of a computing device, cause the one or more processors to:

perform an enrollment process for a known user of the computing device by causing the one or more processors to at least:
receive data indicative of a plurality of images of a face of the known user; determine a number of pose buckets of a plurality of pose buckets that include the plurality of images of the face of the known user, wherein:
each of the plurality of images of the face of the known user is included in at least one pose bucket from a plurality of pose buckets, and
each pose bucket from the plurality of pose buckets is associated with a respective range of pitch angles of the face of the known user and a respective range of yaw angles of the face of the known user;
determine whether the number of pose buckets satisfies a threshold number of pose buckets; and
responsive to determining that the number of pose buckets satisfies a threshold number of pose buckets, associate the data indicative of the plurality of images with a user account for the known user;
subsequent to performing the enrollment process and while the computing device is in a reduced access mode:
receive data indicative of an image of a face of an unknown user of the computing device; and determine whether the unknown user is the known user of the computing device by at least comparing the data indicative of the image of the face of the unknown user to data indicative of one or more images of the plurality of images of the face of the known user; and responsive to determining that the unknown user is the known user, set the computing device to an increased access mode.

16. The non-transitory computer-readable storage medium of claim 15, wherein the instructions, when executed by the one or more processors, further cause the one or more processors to:
select, from the plurality of images of the face of the known user, an image included in a particular pose bucket of the plurality of pose buckets,
wherein the particular pose bucket is associated with the image of the face of the unknown user, and
wherein the instructions that cause the one or more processors to determine whether the unknown user is the known user further cause the one or more processors to determine whether the unknown user is the known user based on the image of the face of the unknown user and the selected image of the face of the known user.

17. The non-transitory computer-readable storage medium of claim 15, wherein the instructions, when executed by the one or more processors, further cause the one or more processors to:
determine, based on the image of the face of the unknown user and each image of the plurality of images of the face of the known user, a respective similarity score for each image of the plurality of images of the face of the known user, wherein each similarity score indicates a similarity between the image of the face of the unknown user and the respective image of the plurality of images of the face of the known user,
wherein the instructions that cause the one or more processors to determine whether the unknown user is the known user further cause the one or more processors to determine whether the unknown user is the known user based on the respective similarity score for the one or more images of the plurality of images of the face of the known user.

* * * * *